US008616307B2

(12) United States Patent
Voronin et al.

(10) Patent No.: US 8,616,307 B2
(45) Date of Patent: Dec. 31, 2013

(54) THERMALLY STABLE DIAMOND BONDED MATERIALS AND COMPACTS (75) Inventors: Georgiy Voronin, Orem, UT (US); J. Daniel Belnap, Lindon, UT (US)

(73) Assignee: Smith International, Inc., Houston, TX (US)

( * ) Notice: Subject to any disclaimer, the term of this patent is extended or adjusted under 35 U.S.C. 154(b) by 427 days.

(21) Appl. No.: 12/970,721

(22) Filed: Dec. 16, 2010

(65) Prior Publication Data
US 2011/0139514 A1  Jun. 16, 2011

Related U.S. Application Data (60) Provisional application No. 61/287,164, filed on Dec. 16, 2009.

(51) Int. Cl.
*E21B 10/36* (2006.01)
(52) U.S. Cl.
USPC ......... 175/434; 175/433; 175/425; 175/420.2
(58) Field of Classification Search
USPC ................ 175/434, 433, 425, 420.2
See application file for complete search history.

(56) References Cited

U.S. PATENT DOCUMENTS

| | | | | |
|---|---|---|---|---|
| 4,082,185 | A * | 4/1978 | Strong | 206/525 |
| 4,871,377 | A | 10/1989 | Frushour | |
| 4,954,139 | A * | 9/1990 | Cerutti | 51/293 |
| 5,127,923 | A | 7/1992 | Bunting et al. | |
| 6,709,747 | B1 | 3/2004 | Gordeev et al. | |
| 7,060,641 | B2 | 6/2006 | Qian et al. | |
| 2005/0133277 | A1 * | 6/2005 | Dixon | 175/426 |
| 2005/0263328 | A1 | 12/2005 | Middlemiss | |
| 2007/0079994 | A1 | 4/2007 | Middlemiss | |
| 2008/0115421 | A1 | 5/2008 | Sani | |
| 2008/0206576 | A1 | 8/2008 | Qian et al. | |
| 2008/0302579 | A1 | 12/2008 | Keshavan et al. | |
| 2009/0090563 | A1 | 4/2009 | Voronin et al. | |
| 2009/0114454 | A1 | 5/2009 | Belnap et al. | |
| 2009/0152018 | A1 | 6/2009 | Sani | |

FOREIGN PATENT DOCUMENTS

| | | |
|---|---|---|
| EP | 0 196 777 A1 | 10/1986 |
| GB | 2 408 735 A | 6/2005 |

OTHER PUBLICATIONS

Notification of the Transmittal of the International Search Report and the Written Opinion of the International Searching Authority, or the Declaration dated May 31, 2011 for corresponding International Application No. PCT/US2010/060865 dated Dec. 16, 2010; total pp. 20.

* cited by examiner

*Primary Examiner* — Cathleen Hutchins
(74) *Attorney, Agent, or Firm* — Novak Druce Connolly Bove + Quigg LLP (57) ABSTRACT

Thermally stable diamond bonded construction comprise a diamond bonded body including a thermally stable region, comprising a plurality of diamond grains bonded together by a reaction product of the diamond grains with a reactant such as Si, and a polycrystalline diamond region, comprising intercrystalline bonded diamond and a catalyst material. The body further comprises a ceramic compound formed by reaction of an Nb, Zr, Ti, or Mo getter material with a gaseous element generated during HPHT sintering of the diamond bonded body. The diamond bonded body may comprise from 0.1 to 15 percent by weight of the ceramic compound. The diamond bonded body can be formed during a single HPHT process operated at different temperatures when the reactant has a melting temperature above the catalyst material. The construction may include a metallic substrate attached to the diamond bonded body to facilitate use as a wear or cutting element.

32 Claims, 6 Drawing Sheets

THERMALLY STABLE DIAMOND BONDED MATERIALS AND COMPACTS

CROSS-REFERENCE TO RELATED APPLICATIONS

This application claims the benefit of U.S. Provisional Application No. 61/287,164 filed Dec. 16, 2009, which is herein incorporated by reference in its entirety.

BACKGROUND OF THE INVENTION

1. Field of the Invention

This invention generally relates to diamond bonded materials and constructions, more specifically, diamond bonded materials and constructions comprising a silicon containing region and compacts/constructions formed therefrom that are engineered to provide desired properties of improved thermal stability and fracture toughness when compared to conventional polycrystalline diamond materials.

2. Background of the Invention

Polycrystalline diamond (PCD) materials and PCD elements formed therefrom are well known in the art. Conventional PCD is formed by combining a volume of diamond powder and subjecting the same extremely high pressure-high temperature (HPHT) process conditions in the presence of a suitable catalyst material, wherein the catalyst material promotes desired intercrystalline diamond-to-diamond bonding between the diamond grains, thereby forming a sintered PCD structure. The resulting PCD structure produces enhanced properties of wear resistance and hardness, making PCD materials extremely useful in aggressive wear and cutting applications where high levels of wear resistance and hardness are desired.

Catalyst materials that are typically used for forming conventional PCD include metals from Group VIII of the CAS version of the Periodic table taken from the CRC Handbook of Chemistry and Physics, with cobalt (Co) being the most common. Conventional PCD may comprise from 85 to 95% by volume diamond and a remaining amount of catalyst material. The sintered PCD has a material microstructure comprising a matrix phase of intercrystalline bonded diamond with a plurality of interstitial regions dispersed within the matrix. The catalyst material is present in the microstructure of the PCD material within interstitial regions.

A problem known to exist with such conventional PCD materials is thermal degradation due to differential thermal expansion characteristics between the interstitial catalyst material and the intercrystalline bonded diamond. Such differential thermal expansion is known to occur at temperatures of about 400° C., causing ruptures to occur in the diamond-to-diamond bonding, and resulting in the formation of cracks and chips in the PCD structure.

Another problem known to exist with conventional PCD materials is also related to the presence of the catalyst material in the interstitial regions and the adherence of the catalyst to the diamond crystals to cause another form of thermal degradation. Specifically, the catalyst material is known to cause an undesired catalyzed phase transformation in diamond (converting it to carbon monoxide, carbon dioxide, or graphite) with increasing temperature, thereby limiting practical use of the PCD material to about 750° C.

Attempts at addressing such unwanted forms of thermal degradation in PCD are known in the art. Generally, these attempts have involved the formation of a PCD body having an improved degree of thermal stability when compared to the conventional PCD material discussed above. One known technique of producing a thermally stable PCD body involves at least a two-stage process of first forming a conventional sintered PCD body, by combining diamond grains and a cobalt catalyst material and subjecting the same to HPHT, and then removing the catalyst material therefrom.

This method, which is fairly time consuming, produces a resulting PCD body that is substantially free of the solvent catalyst material, and is therefore promoted as providing a PCD body having improved thermal stability. However, the resulting thermally stable PCD body, or thermally stable polycrystalline diamond (TSP) typically does not include a metallic substrate attached thereto by catalyst infiltration from such metallic substrate due to the catalyst removal process. Such TSP body also has a coefficient of thermal expansion that is sufficiently different from that of conventional metallic substrate materials (such as WC—Co and the like) that are typically infiltrated or otherwise attached to the PCD body to provide a PCD compact that adapts the PCD body for use in many desirable applications. This difference in thermal expansion between the thermally stable PCD body and the metallic substrate, and the poor wetability of the thermally stable PCD body diamond surface makes it very difficult to bond the thermally stable PCD body to conventionally used metallic substrates, thereby requiring that the PCD body itself be attached or mounted directly to a device for use.

However, since such conventional thermally stable PCD body is devoid of a metallic substrate, it cannot (e.g., when configured for use as a drill bit cutter) be attached to a drill bit by conventional brazing process. The use of such TSP body in this particular application necessitates that the PCD body itself be mounted to the drill bit by mechanical or interference fit during manufacturing of the drill bit, which is labor intensive, time consuming, and which does not provide a most secure method of attachment.

Additionally, because such conventional thermally stable PCD body no longer includes the catalyst material, it is known to be relatively brittle and have poor impact strength and toughness, thereby limiting its use to less extreme or severe applications and making such TSP bodies generally unsuited for use in aggressive applications such as subterranean drilling and the like.

It is, therefore, desired that a diamond bonded construction be developed that has improved properties of thermal stability when compared to conventional PCD materials. It is also desired that a diamond compact be developed that includes a thermally stable diamond material bonded to a suitable metallic substrate to facilitate attachment of the compact to an application device by conventional method such as welding or brazing and the like. It is further desired that such thermally stable diamond material and compact formed therefrom have improved properties of hardness/toughness without sacrificing desired properties of impact strength and fracture toughness when compared to the conventional TSP material described above. It is further desired that such a product may be manufactured at reasonable cost without requiring excessive manufacturing times and without the use of exotic materials or techniques.

SUMMARY OF THE INVENTION

Thermally stable diamond bonded constructions as disclosed herein comprise a diamond bonded body that includes a thermally stable region. The thermally stable region has a material microstructure comprising a plurality of diamond grains that are bonded together by a reaction product of the diamond grains with a reactant. In a preferred embodiment, the reactant is silicon. The material microstructure further comprises a ceramic compound formed by reacting a getter material with a gaseous element generated during formation of the diamond bonded body at HPHT conditions.

In an example embodiment, the getter material is selected from the group consisting of Nb, Zr, Ti, Mo and mixtures thereof, and the ceramic compound is selected from the group consisting of oxides, nitrides, and hydrides of such getter material. In the range of from about 0.1 to 10 percent by weight of the getter material may be used to form the diamond bonded body, and the diamond bonded body may comprise in the range of from about 0.1 to 15 percent by weight of the ceramic compound.

In an example embodiment, the thermally stable diamond bonded construction comprises a polycrystalline diamond region positioned adjacent the thermally stable region and that includes intercrystalline bonded diamond grains and a metal solvent catalyst disposed within interstitial regions. The polycrystalline diamond region may or may not include the reaction product present in the thermally stable region, and the thermally stable diamond region is substantially free of the metal catalyst material selected used to form the polycrystalline diamond region. In such embodiment it is desired that the reactant used to form the thermally stable region be selected from the group of materials capable of reacting with the diamond at a temperature below the melting temperature of the metal solvent catalyst to facilitate formation of the diamond bonded body during a single HPHT cycle operated at different temperatures.

The thermally stable diamond bonded construction may include a metallic substrate attached to the diamond bonded body to facilitate its use as a wear and/or cutting element, e.g., on a bit used to drill earthen formations. Such thermally stable diamond bonded constructions have combined improved properties of thermal stability, hardness/toughness without sacrificing desired properties of impact strength and fracture resistance when compared to conventional PCD materials. Such thermally stable diamond bonded constructions enable HPHT formation in a manner that minimizes and/or eliminates unwanted sintering defects.

BRIEF DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION

Thermally stable diamond bonded materials and compacts disclosed herein are specifically engineered having a diamond bonded body formed using a getter material to control the unwanted presence of gaseous contaminates formed during the HPHT sintering process. Such diamond bonded materials further comprise a thermally stable diamond bonded region, thereby providing improved thermal stability when compared to conventional PCD materials. As used herein, the term PCD is used to refer to polycrystalline diamond that has been formed, at HPHT conditions, through the use of a catalyst material, e.g., a metal solvent catalyst, such as those metals included in Group VIII of the CAS version of the Periodic table taken from the CRC Handbook of Chemistry and Physics the Periodic table. The thermally stable diamond bonded region in diamond bonded bodies disclosed herein, although containing a population of bonded together diamond crystals, is not referred to as being PCD because is does not include a metal solvent catalyst. Further, such thermally stable diamond bonded region is not referred to as being TSP because it is not formed by the removal of a catalyst material from sintered PCD.

Thermally stable diamond bonded constructions may comprise a diamond bonded body that is formed entirely of the thermally stable diamond bonded region. In another embodiment, the thermally stable diamond bonded construction may include both the thermally stable diamond bonded region and a region comprising conventional PCD, i.e., intercrystalline bonded diamond formed using a catalyst material. Thermally stable diamond bodies as disclosed herein provide properties of hardness/toughness and impact strength that are superior to conventional TSP materials that have been rendered thermally stable by having substantially all of the catalyst material removed therefrom. Further, the presence of a PCD region in the diamond bonded body also facilitates attachment of the thermally stable diamond bonded body to a desired metallic substrate to form a thermally stable diamond bonded compact that may be attached to cutting or wear devices, e.g., drill bits when the diamond bonded compact is configured as a cutting element, by conventional means such as by brazing and the like.

In an example embodiment, a feature of such thermally stable diamond bonded materials and compacts is that they may be formed during a single HPHT process, which process is controlled to produce a desired thermally stable diamond bonded material in one region of the body, while also providing PCD in another region to provide a permanent attachment between the diamond bonded body and a desired metallic substrate. Example embodiments comprising a diamond bonded body comprising exclusively the thermally stable diamond bonded region may also be formed during a single HPHT process.

Figure 1:
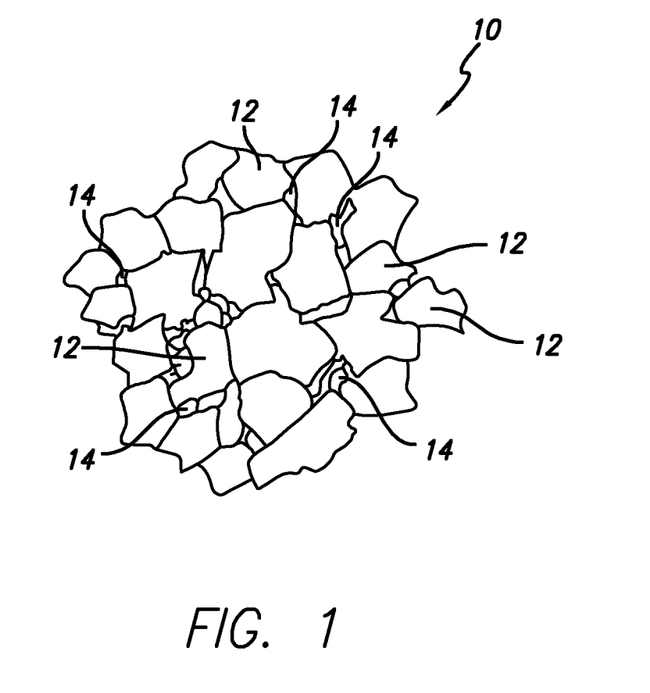
FIG. 1 is schematic view taken from a thermally stable region of a diamond bonded material.

FIG. 1 illustrates a region of a sintered thermally stable diamond bonded material 10 as disclosed herein having a material microstructure comprising the following material phases. A first material phase 12 comprises intercrystalline bonded diamond that is formed by the bonding together of adjacent diamond grains at HPHT. A second material phase 14 is disposed interstitially between the bonded together diamond grains or crystals and comprises a reaction product of a preselected material with the diamond that functions to bond the diamond grains together. Accordingly, the material microstructure of this region comprises a distribution of both intercrystalline bonded diamond, and diamond grains that are bonded together by reaction with the preselected bonding agent.

Additionally, because the sintered diamond body is formed using a getter material to control the unwanted presence of gaseous contaminates during HPHT process, inert ceramic compounds are formed by reaction of the getter material with the gaseous contaminates and are present within the microstructure illustrated in FIG. 1, specifically in the second material phase 14.

Diamond grains useful for forming thermally stable diamond bonded materials as disclosed herein include synthetic diamond powders having an average diameter grain size in the range of from submicrometer in size to 100 micrometers, and more preferably in the range of from about 5 to 80 micrometers. The diamond powder may contain grains having a mono or multi-modal size distribution. In an example embodiment, the diamond powder has an average particle grain sized of approximately 20 micrometers. In the event that diamond powders are used having differently sized grains, the diamond grains are mixed together by conventional process, such as by ball or attrittor milling for as much time as necessary to ensure good uniform distribution.

The diamond grain powder is preferably cleaned, to enhance the sinterability of the powder by treatment at high temperature, in a vacuum or reducing atmosphere. The diamond powder mixture is loaded into a desired container for placement within a suitable HPHT consolidation and sintering device. In an example embodiment where the diamond bonded body is to be attached to a metallic substrate, a suitable metallic substrate material (in powder, green-state, or already-sintered form) is disposed within the consolidation and sintering device adjacent the diamond powder mixture.

It is desired that the volume content of diamond be relatively high, and in a preferred embodiment be greater than about 90 percent by volume. The high volume content of diamond operates to provide desired elevated properties of abrasion resistance suitable for certain end-use applications. Additionally, the high volume content of diamond operates to control the amount of the second phase material present in the thermally stable region after sintering as described in greater detail below.

The diamond volume may be provided in the form of a powder, or may be provided in the form of a highly-dense diamond perform, such as diamond tape or the like where the diamond is provided having the desired diamond volume content and is combined with a suitable binder. If such green-state diamond perform is used, it is desired that the assembly be subjected to a temperature sufficient to remove the binder prior to HPHT processing.

In an example embodiment, the diamond powder is combined with a getter material that is capable of acting in situ during the HPHT process to convert any gaseous contaminates, such as oxygen or the like that are formed during the HPHT process, to inert compounds such as ceramic compounds of the like. Oxygen contamination originating from absorbed material on particular surfaces is associated with many sintering problems, including cracking, during the HPHT manufacturing process of making polycrystalline diamond. Accordingly, it is desired that the diamond volume include a minimum amount of suitable getter material to neutralize the presence of such unwanted gaseous contaminates as much as possible.

Desired getter materials useful in this regard include those that are capable of reacting with oxygen to convert the same to an inert ceramic compound. Example getter materials include Nb, Zr, Ti, Mo and combinations thereof. The amount of the getter material that is combined with the diamond volume will vary depending on the particular volume fraction of diamond that is used and/or the particular HPHT conditions. In an example embodiment, it is desired that in the range of from about 0.1 to 10 percent by weight, preferably in the range of from about 0.2 to 5 percent by weight, and more preferably in the range of from about 0.5 to 3 percent by weight of the getter materials be used. Using more than about 10 percent by weight of the getter material is more than what is needed to provide a desired degree of control over the amount of gaseous contaminates generated or present in the diamond volume. Using less than about 0.1 percent by weight of the getter material is less then what is needed to provide a desired degree of control over the amount of gaseous contaminates generated or present in the diamond volume during the sintering process.

The getter material is dispersed throughout the diamond volume that is used to form the diamond bonded body to control the formation of gaseous contaminates throughout the diamond bonded body. In an example embodiment, the getter material operates to convert such gaseous contaminates into inert ceramic compounds such as oxides, nitrides, and hydrides of Nb, Zr, Ti, Mo.

In an example embodiment, the diamond bonded body comprises in the range of from about 0.1 to 15 percent by weight of the ceramic compound, preferably in the range of from about 0.2 to 7.5 percent by weight of the ceramic compound, and more preferable in the range of from about 0.5 to 4.5 percent by weight of the ceramic compound.

In a preferred embodiment, the metallic substrate is provided in a preformed state and includes a metal solvent catalyst that is capable of infiltrating into the adjacent diamond powder mixture during processing. Suitable metal solvent catalyst materials present in the metallic substrate include those metals selected from Group VIII elements of the CAS version of the Periodic table taken from the CRC Handbook of Chemistry and Physics of the Periodic table. A particularly preferred metal solvent catalyst is cobalt (Co). Alternatively, the metallic substrate may be provided in powder or in otherwise a green-state form and combined with the diamond volume for HPHT processing.

The materials used as the metallic substrate may be selected from the group of materials conventionally used as metallic substrate materials for forming conventional PCD compacts such as metallic materials, ceramic materials, cermets, and combinations thereof. In a preferred embodiment, the metallic substrate material comprises cemented tungsten carbide (WC—Co).

While the presence of a metallic substrate during the HPHT process has been disclosed above in an example embodiment, it is to be understood that thermally stable diamond bonded bodies as described herein may be formed independently without the use of a metallic substrate. In such instances, the diamond bonded body resulting from the HPHT process may be subsequently attached to a metallic substrate if so desired by conventional process, e.g., by HPHT process, welding, brazing process or the like.

In an example embodiment, it is desired that a predetermined region of the diamond bonded body formed during the consolidation and sintering process become thermally stable. It may also be further desired that a predetermined region of the diamond body formed during the same process form a desired attachment with a metallic substrate. In an example embodiment, the predetermined region to become thermally stable is one that will form the wear or cutting surface of the final product.

In an example embodiment, where the resulting diamond bonded body comprises both a thermally stable region and a conventional PCD region, a suitable first or initial stage infiltrant is disposed adjacent a surface portion of the predetermined region of the diamond powder to become thermally stable. The first infiltrant may be selected from those materials having a melting temperature that is below the melting temperature of the metal solvent catalyst in the metallic substrate, that are capable of infiltrating the diamond volume upon melting during processing, and that are capable of bonding together the diamond grains. In an example embodiment, the first infiltrant actually participates in the bonding process, forming a reaction product with the diamond that operates to bond the diamond grains together.

In a preferred embodiment, the first infiltrant is a silicon material that may be provided in a form suitable for placement and use within the consolidation and sintering device. In an example embodiment, the silicon material may be provided in the form of a silicon metal foil, or powder, or in the form of a compacted green powder, or in the form of a disk. The first infiltrant is positioned within the device adjacent the surface of the predetermined region of the diamond powder to become thermally stable. In an example embodiment, the first infiltrant is positioned adjacent the diamond powder during assembly of the container prior to its placement into the HPHT consolidation and sintering device.

Although the getter material has been described above as being mixed together with the diamond powder, or otherwise provided in the diamond powder volume before being subjected to the HPHT process, it is to be understood that the getter material may also or alternatively be introduced into the diamond powder volume during an infiltration step of the HPHT process, e.g., along with the first infiltrant material.

The device is then activated to subject the container to a desired HPHT condition to effect consolidation and sintering. In an example embodiment, the device is controlled so that the container is subjected to a HPHT process where the applied pressure and temperature is first held at a suitable intermediate level for a period of time sufficient to melt the first infiltrant, e.g., the silicon material, and allow the first infiltrant to infiltrate into the diamond powder mixture and react with and bond together the diamond grains. In such example embodiment, the intermediate level may be at a pressure of approximately 5,500 MPa, and at a temperature of from about 1,150° C. to 1,300° C. It is to be understood that the particular intermediate pressure and temperatures presented above are based on using a silicon metal first infiltrant and a specific type and volume of diamond powder. Accordingly, pressures and/or temperatures other than those noted above may be useful for other types of infiltrants and/or other types and volumes of diamond powder.

The use of temperatures below this range may not be well suited for the intermediate level, when silicon metal is chosen as the first infiltrant, because at lower temperatures the silicon metal may not melt, and thus not infiltrate into the diamond mixture as desired. Using a temperature above this range may not be desired for the intermediate level because, although the first infiltrant will melt and infiltrate into the diamond powder mixture, in this example embodiment such higher temperature may also cause a second stage infiltrant, i.e., the metal solvent catalyst in the metallic substrate (e.g., cobalt), to melt and infiltrate the diamond grains at the same time.

Infiltration of the metal solvent catalyst prior to or at the same time as infiltration of the first infiltrant, e.g., silicon metal, is not desired because it may initiate unwanted conventional diamond sintering throughout the diamond body. Such conventional diamond sintering operates to inhibit infiltration into the diamond mixture by the first stage infiltrant, thereby preventing reaction of the first infiltrant with the diamond grains and precluding formation of the desired thermally stable diamond region.

During this intermediate stage of processing, the first infiltrant melts and infiltrates into the adjacent surface of the diamond mixture. In the case where the first infiltrant is a silicon metal, it then reacts with the diamond grains to form silicon carbide (SiC) between the diamond particles in the adjacent region of the compact. In such example embodiment, where silicon is provided as the selected first infiltrant, it is desired that the intermediate level of processing be held for a period of time of from 1 to 20 minutes. This time period must be sufficient to melt all of the silicon, allow the melted silicon to infiltrate the diamond powder, and allow the infiltrated silicon to react with the diamond to form the desired SiC, thereby bonding the diamond particles together. It is desired that substantially all of the silicon infiltrant be reacted, as silicon metal is known to be brittle and any residual unreacted silicon metal in the diamond may have a deleterious effect on the final properties of the resulting thermally stable diamond bonded compact.

While particular intermediate level pressures, temperatures and times have been provided, it is to be understood that one or more of these process variables may change depending on such factors as the type and amount of infiltrant and/or diamond powder that is selected. A feature of this example embodiment, is that the temperature for the intermediate level be below the melting temperature of the second stage infiltrant, i.e., the metal solvent catalyst in the metallic substrate, to permit the first stage infiltrant to infiltrate and react with the diamond powder prior to melting and infiltration of the metal solvent catalyst.

In an example embodiment, where the thermally stable diamond bonded body and compact being formed is provided in the form of a diamond cutter or cutting element, the first infiltrant is positioned within the HPHT device adjacent what will be a working or cutting surface of the diamond bonded body, and the silicon infiltrates the diamond body a desired depth from the working surface, thereby providing a desired thermally stable diamond bonded region extending the desired depth from the working surface. In such example embodiment, the silicon may infiltrate the diamond powder a depth from the working surface of from about 1 to 1,500 micrometers, and preferably at least 10 micrometers. In an example embodiment, the silicon may infiltrate the diamond powder a depth from the working surface of from about 500 to 1,000 micrometers.

In an example embodiment, it may be desired to form a nonplanar interface of between the different regions within the diamond bonded body. For example, it may be desired that the interface between the thermally stable region and the adjacent PCD region be nonplanar for the purpose of resisting any potential cracking or delamination along a single plane between these regions, thus providing a more robust interface between the two. Such nonplanar interface may be produced during HPHT sintering by using a first infiltrant source, e.g., in the form of a foil or disc, configured having a nonuniform thickness. In one example, the first infiltrant source may be provided in the form of a disc that is thicker along an outer region than an inner region (shown in FIG. 4). During first stage HPHT processing, the thicker portion of the first infiltrant source promotes a deeper infiltration of the infiltrant into the diamond body than the thinner portion, thereby forming a first region of thermally stable diamond that extends into the diamond body in a nonplanar fashion.

In an example embodiment, it may be desired to promote the formation of a deeper thermally stable region within the diamond body along a region of the diamond body that corresponds to a working surface, and a shallower thermally stable region corresponding to a region of the diamond body removed from the working surface. This feature of adjusting the depth and placement location of the thermally stable region within the diamond body enables one to engineer the diamond body in a manner best suited to meet the needs of a particular end-use application.

Additionally, it may be desired that the thermally stable diamond region only exist in one discrete region of the diamond body and not extend along the entire surface of the diamond body. For example, compacts comprising such diamond body may be used in certain end-use applications were there only exists a certain region of the compact exposed to wear, e.g., along an outer edge of the contact. In such embodiment, it may be desired to engineer the compact so that the thermally stable region is formed only along this outer edge region (shown in FIG. 5). The thermally stable region may be formed in such discrete locations by use of an appropriately configured first infiltrant source. In one example embodiment, the first infiltrant source may be provided in the form of a foil or a disc that only partially covers a desired area of the diamond volume, i.e., wherein the desired area corresponds to the location of the desired thermally stable region. In such embodiment, the PCD region of the diamond body may extend to a surface of the diamond bonded body or wherever in the body the thermally stable region has not been formed.

A feature of such example embodiment thermally stable diamond bonded materials and compacts is that the thermally stable region of the diamond body both comprises the getter material and is formed in a single process step without the presence or assistance of a conventional metal solvent catalyst, such as cobalt, and without the need for subsequent processing to remove the metal solvent catalyst. Rather, the thermally stable region is formed by the infiltration and reaction of a first stage infiltrant, such as silicon, into the diamond powder during HPHT processing to produce a bonded reaction product between the diamond grains.

After the desired time has passed during the intermediate level of the HPHT process, the consolidation and sintering process is continued by increasing the temperature to a range of from about 1,350° C. to 1,500° C. The pressure for this secondary processing step is preferably maintained at the same level as noted above for the intermediate level. At this temperature, the second stage infiltrant in the form of the metal solvent catalyst component in the metallic substrate melts and infiltrates into an adjacent region of the diamond powder mixture, thereby sintering the adjacent diamond grains in this region by conventional method to form conventional PCD in this region, and forming a desired attachment or bond between the PCD region of the diamond bonded body and the metallic substrate.

While the second stage infiltrant in this example embodiment has been described as being provided from a metallic substrate positioned adjacent the diamond powder volume, it is to be understood that the second stage infiltrant for such example embodiment may alternatively be provided in powder form mixed together with a portion of the diamond volume. For example, the diamond volume used to form the thermally stable diamond bonded body according to this example embodiment may comprise a first diamond volume layer positioned to receive the first stage infiltrant (and that does not include the second stage infiltrant) and a second diamond volume layer (that does include the second stage infiltrant).

While a particular temperature range for this secondary phase HPHT processing has been provided, it is to be understood that such secondary processing temperature may and will vary depending on such factors as the type and/or amount of metal solvent catalyst used in the metallic substrate, as well as the type and/or amount of diamond powder used to form the diamond bonded body.

In the example embodiment discussed above, where the diamond bonded compact is configured for use as a cutter, the region of the compact body that is secondarily infiltrated with the metal solvent catalyst component from the metallic substrate is positioned adjacent a surface of the diamond mixture opposite from the working surface, and it is desired that the metal solvent catalyst infiltration depth be sufficient to provide a secure bonded attachment between the metallic substrate and diamond bonded body.

During this secondary or final phase of the HPHT processing, the metal solvent catalyst, e.g., cobalt, infiltrates between the diamond grains in the region of the diamond powder adjacent the metallic substrate to provide highly localized catalysis for the rapid creation of strong bonds between the diamond grains or crystals, i.e., producing intercrystalline bonded diamond or conventional PCD. As these bonds are formed, the cobalt moves into and remains disposed within interstitial regions between the intercrystalline bonded diamond.

While there may be some possibility that, during this secondary phase of processing, the metal solvent catalyst from the metallic substrate may infiltrate into the diamond powder to a point where it passes into the thermally stable region of the diamond bonded body, there is no indication that reactions between the metal solvent catalyst and any unreacted infiltrant, e.g., silicon, or reactions between the metal solvent catalyst and the infiltrant reaction product, e.g., silicon carbide, takes place or if it does has had any deleterious effect on the final properties of the diamond bonded body.

As noted above, when the first stage infiltrant selected for forming the thermal stable diamond region is silicon, the infiltrated silicone forms a reaction phase with the diamond grains, crystals or particles in the diamond bonded phase according to the reaction:

$$Si + C = SiC$$

This reaction between silicon and carbon present in the diamond grains, crystals or particles is desired as the reaction product; namely, silicon carbide is a ceramic material that has a coefficient of thermal expansion that is similar to diamond. At the interface within the diamond bonded body between the thermally stable diamond bonded region and the PCD region, where both cobalt and silicon carbide may be present, reactions such as the following may take place: $Co + 2SiC = CoSi_2 + 2C$. This, however, is not a concern and may be advantageous as $CoSi_2$ is also known to be a thermally stable compound.

Additionally, if the Co and SiC do not end up reacting together at the boundary or interface between the two regions, the presence of the silicon carbide adjacent the PCD region operates to minimize or dilute the otherwise large difference in the coefficient of thermal expansion that would otherwise exist between the intercrystalline diamond and the cobalt phases in PCD region. Thus, the formation of silicon carbide within the silicon-infiltrated region of the diamond bonded body operates to minimize the development of thermal stress in that region and at the boundary between the Si and Co infiltrated regions, thereby improving the overall thermal stability of the entire diamond bonded body.

As noted above, the first stage infiltrant operates to provide a thermally stable diamond bonded region through the formation of a reaction product that actually forms a bond with diamond crystals. While a certain amount of diamond-to-diamond bonding may also occur within this thermally stable diamond region without the benefit of the second stage solvent-catalyst infiltrant, it is theorized that such direct diamond-to-diamond bonding represents a minority of the diamond bonding that occurs in this region. In an example embodiment, where the first stage infiltrant being used is silicon, it is believed that a majority of the diamond within this region is bonded together via the reaction product. In a preferred embodiment, greater than about 75 percent, and more preferably 85 percent or more, of the diamond bonding occurring in the thermally stable region is provided by reaction of the diamond grains or particles with the first stage infiltrant. In diamond-silicon carbide there is still diamond-diamond bonding. However such bonds are formed simply by physical compression during the sintering operation. The silicon carbide occupies the interstitial regions and effectively forms a contiguous material holding the entire diamond structure together.

While ideally, it is desired that all of the diamond bonding in the thermally stable region be provided by reaction with the first stage infiltrant, any amount of diamond-to-diamond bonding occurring in the thermally stable region occurs without the presence or use of a metal solvent catalyst, thus the resulting diamond bonded region is one having an enhanced degree of thermal stability when compared to conventional PCD.

It is to be understood that the amount of the first stage infiltrant used during processing may and will vary depending on such factors as the size of the diamond grains that are used, the volume of diamond grains and region/volume of desired thermal stability, the amount and/or type of the first stage infiltrant material itself, in addition to the particular application for the resulting diamond bonded compact. Additionally, the amount of the first stage infiltrant used must be precisely determined for the purpose of infiltrating and reacting with a desired volume of the diamond powder to provide a desired thermally stable diamond region, e.g., a desired thermally stable diamond depth.

For example, using an excessive amount of the first stage infiltrant, e.g., silicon, to react with the diamond powder during intermediate stage processing may result in excess infiltrant being present during secondary or final processing when the second stage metal solvent catalyst infiltrant e.g., cobalt, in the metallic substrates melts, infiltrates, and facilitates conventional diamond sintering adjacent the metallic substrate. Excess first stage infiltrant present during this secondary phase of processing may remain unreacted as a brittle silicon phase or may react with the metal solvent catalyst material to form cobalt disilicide ($CoSi_2$) at the boundary between the two regions. Further, SiC formed as the reaction product is known to be brittle, so it is desired that the amount of the SiC present in the thermally stable region of the diamond body also be controlled.

In addition to silicon, the thermally stable region of example embodiment diamond bonded materials and compacts disclosed herein may be formed from other types of first stage materials. Such materials must be capable of melting or of reacting with diamond in the solid state during processing of the diamond bonded materials at a temperature that is below the melting temperature of any metal solvent catalyst component that may be present in the diamond volume or otherwise present as a constituent of a metallic substrate present during HPHT processing of the diamond bonded body. Additionally, such first stage material must, upon reacting with the diamond, form a compound having a coefficient of thermal expansion that is relatively closer to that of diamond than that of the metal solvent catalyst. It is also desired that the compound formed by reaction with diamond be capable of bonding with the diamond and must possess significantly high-strength characteristics.

In an example embodiment, the source of silicon that is used for initial infiltration is provided in the form of a silicon metal disk. As noted above, the amount of silicon that is used may influence the depth of infiltration as well as the resulting types of silicon compounds that may be formed. It is desired that the amount of the SiC that is formed also be controlled for the purpose of regulating the brittleness of the diamond region comprising the same. In an example embodiment, the desired amount of the SiC material formed in the diamond body is less than about 20 percent by volume, preferably in the range of from about 2 to 15 percent by volume, and more preferably in the range of from about 5 to 10 percent by volume.

Another embodiment thermally stable diamond bonded compact as disclosed herein may be formed by mixing diamond powder together with a preselected material capable of participating in solid state reactions with the diamond powder. Thus, unlike the example embodiment described above, the preselected materials useful for forming the thermally stable region in this second embodiment is provided in situ with the diamond powder and is not positioned adjacent a surface of the diamond powder as an initial infiltrant.

Like the earlier example embodiment, it is desired that the diamond volume used to form this other example embodiment be greater than about 90 percent. Further, it is desired that the diamond volume include the getter material as described earlier to control and or eliminate the unwanted presence of gaseous contaminates produced in the sintered product.

Suitable preselected materials useful for forming such other example embodiment thermally stable diamond bonded compacts include those compounds or materials capable of forming a bond with the diamond grains, have a coefficient of thermal expansion that is relatively closer to that of the diamond grains than that of a conventional metal solvent catalyst, that is capable of reacting with the diamond at a temperature that is below that of the melting temperature of any metal solvent catalyst contained in the diamond volume or in a metallic substrate, and that is capable of forming an attachment with an adjacent diamond region, e.g., comprising PCD, in the diamond body.

Example preselected materials useful for forming this other example embodiment include ceramic materials such as TiC, $Al_2O_3$, $Si_3N_4$ and the like. These ceramic materials are known to bond with the diamond grains to form a diamond-ceramic microstructure. In an example embodiment, the volume percent of diamond grains in this mixture is greater than about 90 percent by volume. A feature of this other example embodiment is that it may form both a thermally stable diamond region and a conventional PCD region in the diamond body during a single HPHT process.

Since the preselected material used to bond the diamond grains together in this other example embodiment is mixed together with the diamond grains, the solid state reaction of these materials during HPHT processing operates to form thermally stable diamond within the entire region of the diamond body that was formally occupied by the diamond mixture. In other words, conventional PCD is not formed within this region.

If desired, the mixture of diamond grains and material used to form the reaction product bonding the diamond grains together may be configured, e.g., during powder assembly or the like, to provide a desired nonplanar interface (as described above) with the adjacent diamond volume that will form PCD. Additionally, the mixture may be oriented within the assembly to promote the formation of the thermally stable region along a discrete region of the diamond body as described above, e.g., a region corresponding to the diamond body wear surface.

To accommodate attachment of a desired metallic substrate to the thermally stable region of the diamond body, this other example embodiment may further include use of a green-state diamond grain material disposed adjacent the diamond grain mixture. The green-state diamond grain material may or may not include a metal solvent catalyst. Additionally the green-state diamond grain material may be provided in the form of a single layer of material or in the form of multiple layers of materials. Each layer may include the same or different diamond grain size, diamond volume, and may or may not include the use of a solvent catalyst. In an example embodiment, the green-state diamond grain material may be provided in the form of one or more layers of conventional diamond tape.

Thus, such other example embodiment of the thermally stable diamond construction described herein are formed by mixing together diamond grains, as described above, with the getter material and the desired preselected material for reacting with the diamond grains as noted above. The mixture may be cleaned in the manner noted above and loaded into a desired container for placement within the HPHT device. The green-state diamond grain-containing material is positioned adjacent the mixture. In an example embodiment where the diamond bonded body is to be attached to a metallic substrate, a metallic substrate material as noted above is positioned adjacent the green-state diamond grain-containing material.

The container is placed in the HPHT device and the device is activated to affect consolidation and sintering. Like the process described above of forming the initially disclosed example embodiment, the device is controlled so that the container and its contents is subjected to a HPHT condition wherein the pressure and/or temperature is first held at a suitable intermediate level for a period of time sufficient to cause the desired solid state reaction to occur within the mixture of diamond grains and the preselected material. Subsequently, the HPHT condition is changed to a different pressure and/or temperature. At this subsequent HPHT condition, any solvent catalyst in the green-state diamond grain material melts and facilitates diamond-diamond bonding to form conventional PCD within this region. Also, the two adjacent diamond regions will become attached to one another, and the solvent catalyst in the metallic substrate will melt and infiltrate the adjacent green-state material to form a desired attachment or bond between the PCD region of the diamond body and the metallic substrate.

In this other example embodiment, the intermediate HPHT process conditions are such that will cause the diamond grains and preselected material mixture to undergo solid state reactions to form a thermally stable diamond-ceramic phase. The specific pressure and temperature for this intermediate HPHT condition may and will vary depending on the particular nature of the preselected material that is used to react with the diamond grains. Again, the temperature at this intermediate HPHT condition is below the melting point of any solvent catalyst present in the adjacent green-state diamond material, and/or present in any metallic substrate, to ensure formation of the thermally stable diamond region prior to the melting and infiltration of the solvent catalyst.

In an example embodiment where the preselected material is $Al_2O_3$, and the diamond powder used is the same as that described above for the initial example embodiment, the intermediate HPHT process may be conducted at a pressure of approximately 5,500 MPa, and at a temperature of from 1,250° C. to 1,300° C. The intermediate level of HPHT processing may be held for a period of time of from about 10 to 60 minutes to facilitate plastic deformation and filling of the voids between the diamond grains by the ceramic powder and initiation of solid state reactions of the ceramic with the diamond particles. Again, it is to be understood that the intermediate HPHT conditions provided above are based on using $Al_2O_3$ as the preselected material and a specific size and volume of diamond powder. Accordingly, pressure and/or temperatures other than those noted above may be useful for other types of preselected materials and/or other types and/or volumes of diamond powder.

Once the intermediate level HPHT processing has been completed, the HPHT process is changed to facilitate further consolidation and sintering by increasing the temperature to a point where any solvent catalyst present in the green-state material region, and/or the solvent catalyst in any metallic substrate, melts. When the solvent catalyst is cobalt, the temperature is increased to about 1,350° C. to 1,500° C. The pressure at this subsequent HPHT process condition is maintained at the same level as noted above for the intermediate HPHT process condition.

As noted above, at this temperature all or a portion of the green-state diamond material becomes PCD. In the event that the green-state diamond material itself includes a solvent catalyst, then the entire region occupied by the green-state diamond becomes PCD. If the green-state diamond material does not include a solvent catalyst, then at least the portion of the region occupied by the green-state diamond adjacent any metallic substrate that is present becomes PCD by virtue of solvent catalyst infiltration from the metallic substrate. In either case, at this temperature, solvent catalyst from the metallic substrate infiltrates the adjacent portion of the green-state material and the metallic substrate becomes attached or bonded thereto.

In this embodiment where a ceramic material is used as a second phase binder material between the diamond grains forming the thermally stable material, a further HPHT process step at higher temperatures and/or pressures than the previous stages may be desirable to encourage the formation of good sintering of the ceramic phase and reaction with the diamond. In the example embodiment where the preselected material is $Al_2O_3$, the final HPHT process may be conducted at a pressure of approximately 5,500 MPa and at a temperature of 1,500° C. to 1,700° C.

A feature of thermally stable diamond bonded material prepared according to this other example embodiment is that, like the earlier described example embodiment is that the use of getter material operates to control the presence of unwanted gaseous contaminates in the diamond bonded body. Additionally, in an example embodiment, it may be formed during a single HPHT process, i.e., unlike conventional thermally stable diamond that requires the multi-step process of forming conventional PCD, and then removing the solvent catalyst therefrom. Additionally, like the initially disclosed example embodiment, this other example embodiment comprises a high diamond content thermally stable diamond bonded material generally comprising a thermally stable diamond bonded region, a conventional PCD region, and a metallic substrate attached thereto to facilitate attachment of the diamond body to a desired device by conventional means such as brazing at the like.

Figure 2:
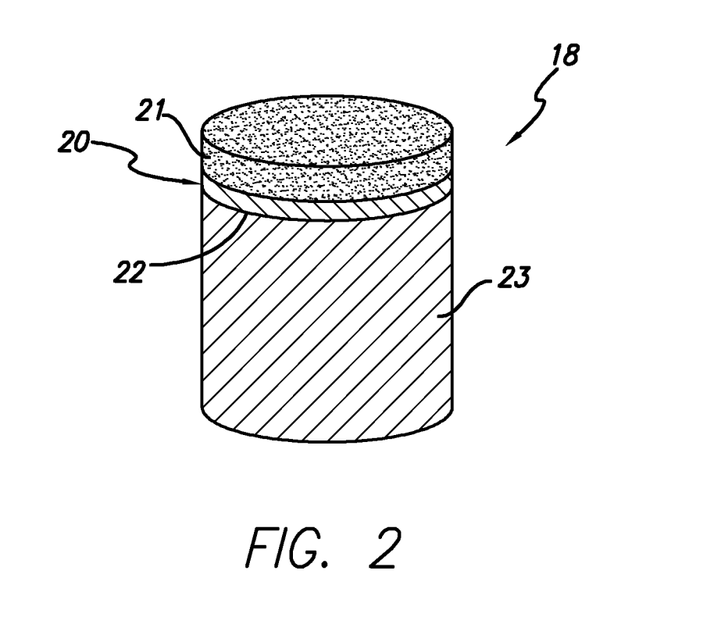
FIG. 2 is a perspective view of an example embodiment thermally stable diamond bonded compact comprising a diamond bonded body and a metallic substrate bonded thereto.

FIG. 2 illustrates an example embodiment thermally stable diamond bonded compact 18 comprising a diamond bonded body 20 formed using the getter material and having the thermally stable diamond region 21 extending along a top surface of the compact, a conventional PCD region 22 joined thereto, and a metallic substrate 23 attached to the PCD region, wherein the PCD region 22 is interposed between the metallic substrate and the thermally stable diamond region. While the diamond bonded compact 18 is illustrated as having a certain configuration, it is to be understood that diamond bonded compacts as disclosed herein may be configured having a variety of different shapes and sizes and placement location of the different diamond regions depending on the particular wear and/or cutting end-use application.

Figure 3:
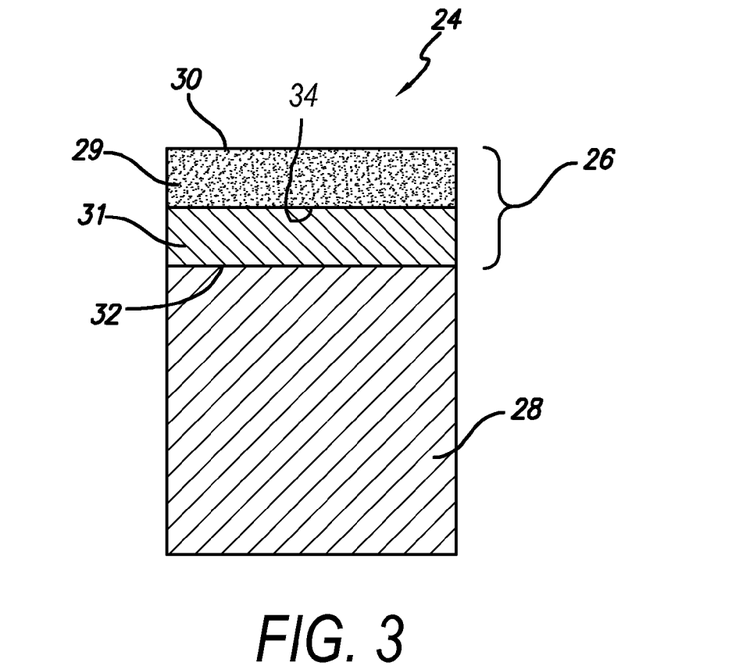
FIG. 3 is a cross-sectional schematic view of an example thermally stable diamond bonded compact of FIG. 2.

FIG. 3 illustrates a cross-sectional side view of an example embodiment thermally stable diamond bonded compact 24 comprising a diamond bonded body 26 that is attached to a metallic substrate 28. The diamond bonded body 26 comprises a thermally stable region 29, extending a depth from a surface 30 of the diamond bonded body, and that is formed according to the example embodiments described above. For example, in one example embodiment the thermally stable region is provided by infiltrating a suitable first stage infiltrant material therein to bond the diamond grains together by reacting with the infiltrant. In another example embodiment, the thermally stable region is provided by mixing a preselected material with the diamond powder to affect solid state reaction with the diamond grains.

In the example embodiments, the thermally stable region 29 has a material microstructure comprising primarily (or a majority of) diamond crystals bonded together by the reaction product of the initial infiltrant or preselected material, and to a lesser extent (or a minority of) diamond-diamond bonded crystals, as best illustrated in FIG. 1. The diamond-to-diamond contact regions in this material are formed purely by physical contact, no diamond regrowth occurs as in cobalt-bonded PCD. As noted above, this region 29 has an improved degree of thermal stability when compared to conventional PCD, due both to the absence of any conventional metal solvent catalyst (i.e., it is substantially free of any metal solvent catalyst) and to the presence of the reaction product between the diamond and the preselected material, as this reaction product has a coefficient of thermal expansion that more closely matches diamond as contrasted to a solvent catalyst, e.g., cobalt.

Referring still to FIG. 3, the diamond bonded body 26 includes a conventional PCD region 31 that extends a depth from the thermally stable region 29 through the body 26 to an interface 32 between the diamond bonded body and the metallic substrate 28. In the initial example embodiment, this conventional PCD region 31 is formed by infiltration of the solvent catalyst into a portion of the diamond grain powder that is adjacent the metallic substrate. In the other example embodiment, this conventional PCD region 31 is formed within the green-state diamond grain material either by the presence of solvent catalyst therein or by infiltration of the solvent catalyst from the metallic substrate.

The thermally stable diamond bonded compact 24 illustrated in FIG. 3 may be formed according to either example embodiment disclosed herein. In one example embodiment, where the PCD region 31 is formed by solvent metal infiltration into the diamond grain powder from the metallic substrate, this region will include an increasing amount of metal solvent catalyst moving from the thermally stable region 29 to the metallic substrate 28. As noted above, such metal solvent catalyst infiltration operates to ensure a desired attachment between the diamond body and the metallic substrate, thereby ensuring use and attachment of the resulting diamond bonded compact to a desired application device by conventional means like brazing.

In a another example embodiment, where the PCD region 31 is formed by sintering of the green-state diamond grain material, the amount of solvent catalyst material may also increase moving towards the metallic substrate due to solvent catalyst infiltration into the adjacent portion of the green-state diamond grain material during second phase HPHT processing.

Figure 4:
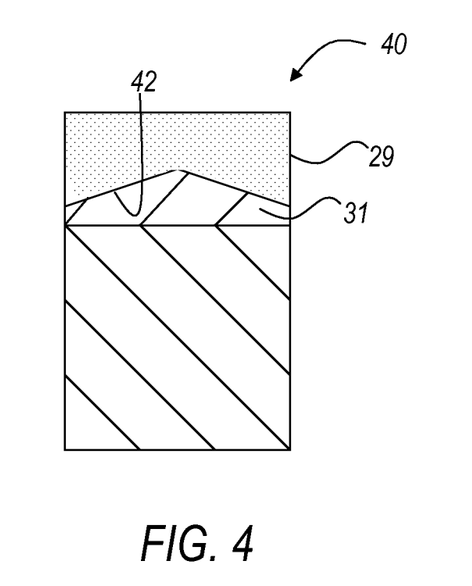
FIG. 4 is a cross-sectional schematic view of an example thermally stable diamond bonded compact having a nonplanar diamond region interface.

In the embodiment illustrated in FIG. 3, the interface 34 between the thermally stable diamond region 29 and the PCD region 31 of the diamond body is planar. FIG. 4 illustrates an example embodiment thermally stable diamond bonded compact that is similar to that illustrated in FIG. 3 in all respect except for the fact that the interface 42 between the thermally stable diamond region 29 and the PCD region 31 of the diamond body is nonplanar. It is to be understood that this is only one example configuration of the nonplanar interface within the diamond body, and the particular nonplanar configuration of the interface may and will vary within the diamond body as desired to meet the particular end-use application, and that such variations are intended to be within the scope as disclosed herein. It is further understood that a nonplanar interface may additionally exist between the metallic substrate and the diamond bonded body.

Figure 5:
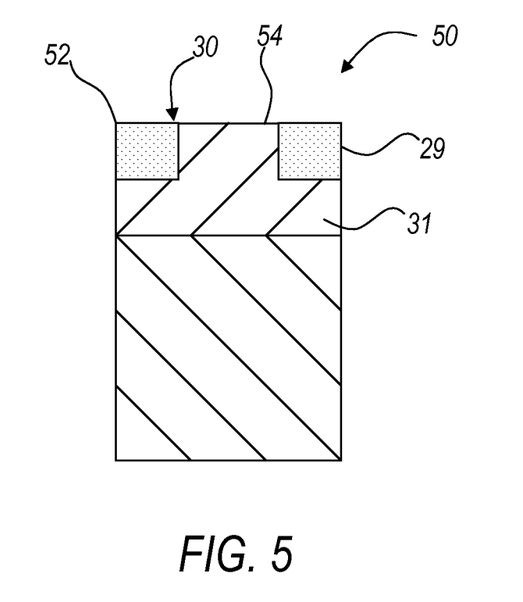
FIG. 5 is a cross-sectional schematic view of an example thermally stable diamond bonded compact having a discrete thermally stable region.

FIG. 5 illustrates an embodiment of the thermally stable diamond bonded compact 50 that is somewhat similar to that illustrated in FIG. 3 except for the fact that the thermally stable region 29 does not extend uniformly within the body 26 and along the entire surface 30 of the body 26. In this particular embodiment, the thermally stable region 29 is configured to extend only along a particular surface portion of the body, e.g., an annular region of the body extending along an outer edge 52 forming a working surface of the compact. In this embodiment, the PCD region 31 extends along a surface 54 of the body so that both the thermally stable and PCD regions of the compact extend along the body surface 30. In this particular example, the PCD region extends along the surface of the body within the annular thermally stable region.

It is to be understood that this is just one example configuration of the discrete thermally stable region within the diamond body, and the particular configuration of the discrete thermally stable region may and will vary within the diamond body as desired to meet the particular end-use application, and that such variations are intended to be within the scope as disclosed herein.

Figure 6:
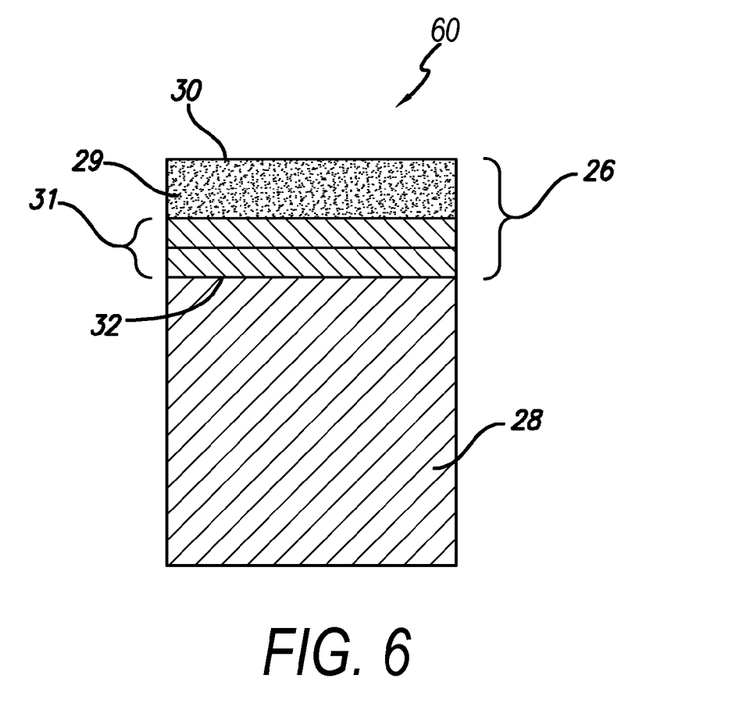
FIG. 6 is a cross-sectional schematic view of another example embodiment thermally stable diamond bonded compact.

FIG. 6 illustrates a thermally stable diamond bonded compact 60 prepared according to the other example embodiment as described above, wherein instead of being formed from a single layer of green-state diamond grain material it is prepared using more than one layer, in this case two layers 31. During the second stage HPHT processing, the two or more green-state diamond grain material layers are bonded together, e.g., by solvent metal infiltration, adjacent diamond-to-diamond bonding, and the like. If desired, the diamond density, and/or diamond grain size, and/or use of solvent catalyst in the two green-state layers used to form this embodiment may vary depending on the particular desired performance characteristics.

Metallic substrates useful for forming thermally stable diamond bonded materials and compacts disclosed herein may be selected from the same general types of materials conventionally used to form metallic substrates for conventional PCD materials, including carbides, nitrides, carbonitrides, cermet materials, and mixtures thereof. A desired feature when forming a diamond bonded body having both a thermally stable region and conventional PCD region during a single HPHT process is that the metallic substrate includes a metal solvent catalyst that melts at a temperature above the melting or reaction temperature of the matrix material mixed with the diamond powder used to form the thermally stable layer. The purpose of the metal solvent catalyst in the metallic substrate is to melt and infiltrate into the adjacent diamond grain region of the diamond body to both facilitate conventional diamond-to-diamond intercrystalline bonding forming PCD, and to form a secure attachment between the diamond bonded body and the metallic substrate. In an example embodiment, the metallic substrate may be formed from cemented tungsten carbide (WC—Co).

While the example embodiments disclosed above have featured diamond bonded bodies having both a thermally stable region and a PCD region, example embodiments may also include diamond bonded bodies that are entirely thermally stable, i.e., that are formed without having a PCD region. In such example embodiment, the diamond bonded body is formed in the manner described above using a desired diamond powder volume or green-state diamond form or the like, and combining a desired getter material thereto. The diamond powder or green-state diamond form may be combined with the same materials disclosed above in the earlier examples for forming the thermally stable region during a HPHT process at the same processing conditions. In this example embodiment, a solvent metal catalyst is not present in any region of the diamond volume or as a metallic substrate so that the resulting sintered diamond body is exclusively thermally stable.

Figure 7:
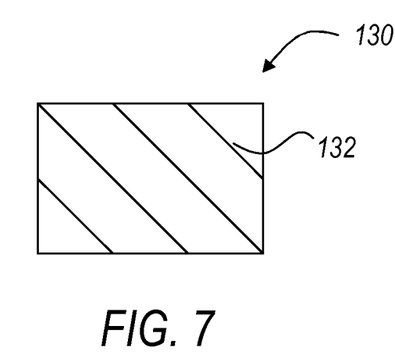
FIG. 7 is a cross-sectional schematic view of an example embodiment thermally stable diamond bonded body.
Figure 8:
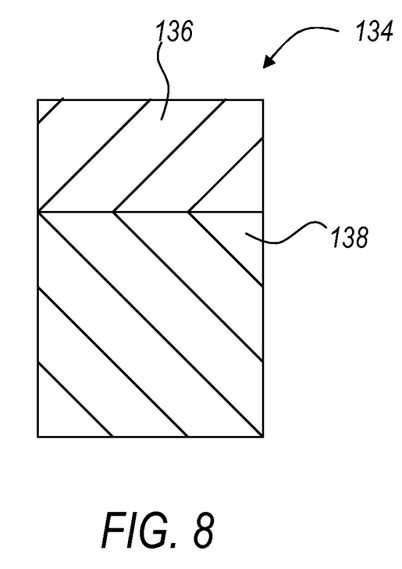
FIG. 8 is a cross-sectional schematic view of an example embodiment thermally stable diamond bonded compact comprising the diamond bonded body of FIG. 7.

FIG. 7 illustrates such an example embodiment, comprising a diamond bonded body 130 formed from thermally stable diamond 132. The thermally stable diamond 132 has the same material microstructure as the thermally stable diamond regions of the earlier disclosed example embodiments. FIG. 8 illustrates a thermally stable diamond bonded compact 134 comprising the diamond bonded body 136 (of FIG. 7) attached to a desired metallic substrate 138. The diamond boned body 136 may be attached to the metallic substrate during a subsequent HPHT process or by other conventional technique, such as by welding, brazing, or the like. A feature of such compact construction is that is does not include conventional PCD.

The above-described thermally stable diamond bonded materials and compacts formed therefrom will be better understood with reference to the following example:

EXAMPLE

Thermally Stable Diamond Bonded Compact

Synthetic diamond powders having an average grain size of approximately 20 micrometers were mixed together with an Nb getter material for a period of approximately 1 hour by ball milling. The mixture contained approximately 98 percent by weight diamond, and 2 percent by weight getter material. The resulting mixture was cleaned by heating to a temperature in excess of 850° C. under vacuum. The mixture was loaded into a refractory metal container with a first stage infiltrant in the form of a silicon metal disk adjacent to a predetermined working or cutting surface of the resulting diamond bonded body. A WC—Co metallic substrate was positioned adjacent an opposite surface of the resulting diamond bonded body. The container was surrounded by pressed salt (NaCl) and this arrangement was placed within a graphite heating element. This graphite heating element containing the pressed salt and the diamond powder and metallic substrate encapsulated in the refractory container was then loaded in a vessel made of a HPHT self-sealing powdered ceramic material formed by cold pressing into a suitable shape.

The self-sealing powdered ceramic vessel was placed in a hydraulic press having one or more rams that press anvils into a central cavity. The press was operated to impose an intermediate stage processing pressure and temperature condition of approximately 5,500 MPa and ramping to a sintering temperature of 1260-1460° C. on the vessel in period of approximately 2-3 minutes. During this intermediate stage HPHT processing, the silicon from the silicon metal disk melted and infiltrated into an adjacent region of the blended diamond powder mixture, and formed SiC by reaction with the diamond in the blended mixture, thereby bonding the diamond grains together.

The press was subsequently operated at constant pressure to impose an increased final temperature of approximately 1260-1460° C. on the vessel for a period of approximately 3-6 minutes. During this final stage HPHT processing, cobalt from the WC—Co metallic substrate infiltrated into an adjacent region of the blended diamond mixture, and intercrystalline bonding between the diamond crystals, and between the diamond crystals and SiC along the interface between the regions took place, thereby forming conventional PCD.

The vessel was opened and the resulting thermally stable diamond bonded compact was removed. Subsequent examination of the compact revealed that the bonded diamond body included a thermally stable upper layer/region of approximately 500 micrometers thick and that was characterized by diamond bonded by SiC. The SiC content was approximately 10 percent by volume in the thermally stable upper layer. This thermally stable region was well bonded to a PCD lower layer/region of approximately 1,000 micrometers thick that consisted of sintered PCD containing residual Co solvent catalyst. The bonded diamond body included from about 0.1 to 15 percent by weight niobium oxide, and did not appear to have any noticeable signs of unwanted cracking or other sintering defects.

A feature of thermally stable diamond bonded materials and compacts as disclosed herein is that they are substantially free of sintering defects caused by the unwanted presence of gaseous contaminates formed during sintering, which unwanted gaseous contaminates are controlled and converted to inert ceramic compounds by the use of the getter material. Further, in example embodiments such thermally stable diamond bonded materials are made during a single HPHT process using staged processing techniques. Compacts as disclosed herein comprise a diamond body formed exclusively of a thermally stable region or having both a thermally stable region and a conventional PCD region, wherein both regions may be formed and adhered to a metallic substrate during such single HPHT process, thereby reducing manufacturing time and expense.

Thermally stable diamond bonded materials and compacts as disclosed herein are specifically engineered having a high diamond volume content and a controlled reaction product content to provide combined properties of high abrasion resistance and low brittleness. Further, thermally stable diamond bonded materials and compacts are formed using getter materials to minimize and/or eliminate the unwanted presence of gaseous contaminates in the diamond body, and thereby prevent cracking and other unwanted events from occurring within the diamond body during sintering. Thermally stable diamond bonded materials and compacts may be configured to have a nonplanar interface between the thermally stable and PCD regions within the body, and/or the thermally stable region may be configured to occupy a discrete region of the body than may not extend entirely along a surface of the body.

Further, thermally stable diamond bonded materials and compacts as disclosed herein are specifically engineered to facilitate use with a metallic substrate, thereby enabling such compacts to be attached by conventional methods such as brazing or welding to variety of different cutting and wear devices to greatly expand the types of potential end-use applications for such compacts.

Thermally stable diamond bonded materials and compacts as disclosed herein may be used in a number of different applications, such as tools for mining, cutting, machining and construction applications, where the combined properties of thermal stability, wear and abrasion resistance are highly desired. Such thermally stable diamond bonded materials and compacts are particularly well suited for forming working, wear and/or cutting components in machine tools and drill and mining bits such as roller cone rock bits, percussion or hammer bits, diamond bits, and shear cutters.

Figures 9, 10, 11:
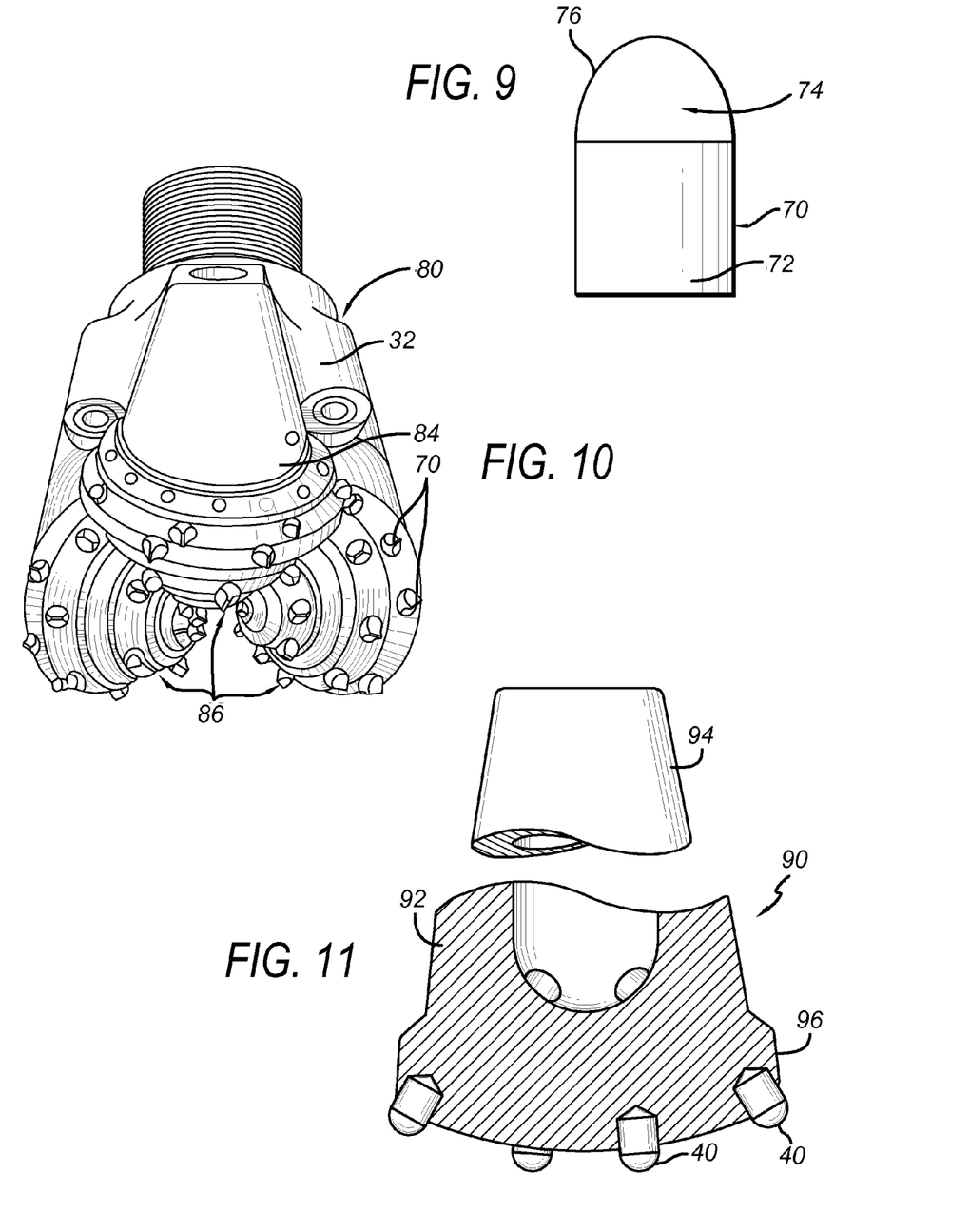
FIG. 9 is a perspective side view of an insert, for use in a roller cone or a hammer drill bit, comprising the thermally stable diamond bonded compact.
FIG. 10 is a perspective side view of a roller cone drill bit comprising a number of the inserts of FIG. 9.
FIG. 11 is a perspective side view of a percussion or hammer bit comprising a number of inserts of FIG. 9.

FIG. 9 illustrates an embodiment of a thermally stable diamond bonded compact as disclosed herein provided in the form of an insert 70 used in a wear or cutting application in a roller cone drill bit or percussion or hammer drill bit. For example, such inserts may be formed from blanks comprising a metallic substrate portion 72 formed from one or more of the metallic substrate materials disclosed above, and a diamond bonded body 74 having a working surface 76 formed from the thermally stable region of the diamond bonded body. The blanks are pressed or machined to the desired shape of a roller cone rock bit insert.

FIG. 10 illustrates a rotary or roller cone drill bit in the form of a rock bit 80 comprising a number of the wear or cutting inserts 40 disclosed above and illustrated in FIG. 9. The rock bit 80 comprises a body 82 having three legs 84, and a roller cutter cone 86 mounted on a lower end of each leg. The inserts 40 may be fabricated according to the method described above. The inserts 40 are provided in the surfaces of each cutter cone 86 for bearing on a rock formation being drilled.

FIG. 11 illustrates the inserts described above as used with a percussion or hammer bit 90. The hammer bit comprises a hollow steel body 92 having a threaded pin 94 on an end of the body for assembling the bit onto a drill string (not shown) for drilling oil wells and the like. A plurality of the inserts 40 are provided in the surface of a head 96 of the body 52 for bearing on the subterranean formation being drilled.

Figure 12:
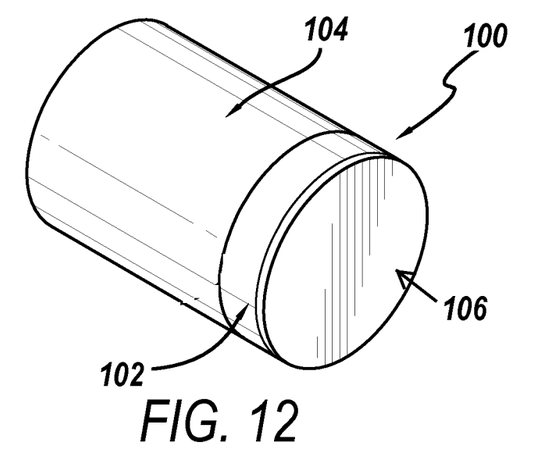
FIG. 12 is a schematic perspective side view of a diamond shear cutter comprising the thermally stable diamond bonded compacts.

FIG. 12 illustrates a thermally stable diamond bonded compact as embodied in the form of a shear cutter 100 used, for example, with a drag bit for drilling subterranean formations. The shear cutter comprises a diamond bonded body 102 that is sintered or otherwise attached to a cutter metallic substrate 104. The diamond bonded body includes a working or cutting surface 106 that is formed from the thermally stable region of the diamond bonded body.

Figure 13:
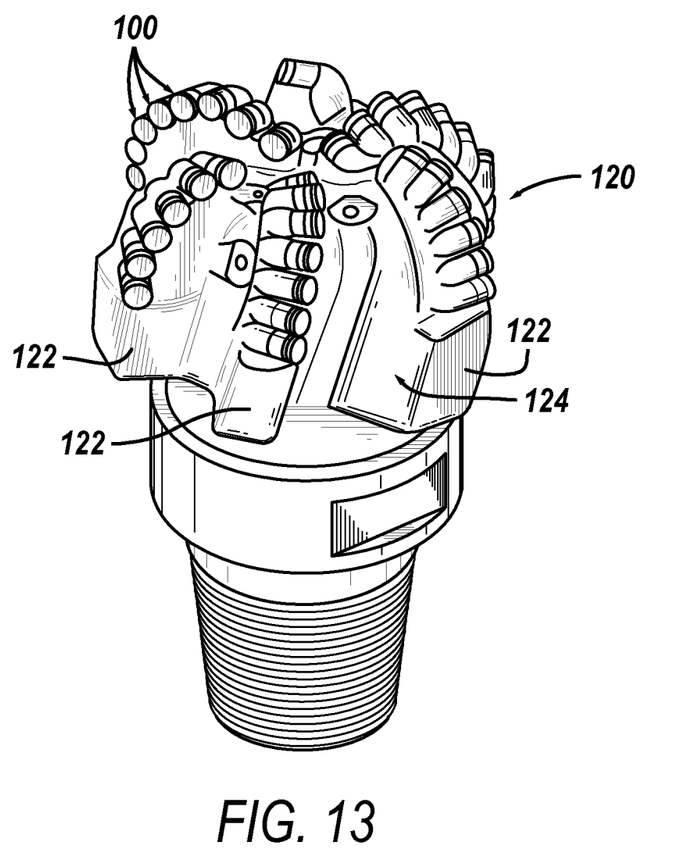
FIG. 13 is a perspective side view of a drag bit comprising a number of the shear cutters of FIG. 12.

FIG. 13 illustrates a drag bit 120 comprising a plurality of the shear cutters 100 described above and illustrated in FIG. 12. The shear cutters are each attached to blades 70 that extend from a head 124 of the drag bit for cutting against the subterranean formation being drilled.

Other modifications and variations of diamond bonded bodies comprising a thermally-stable region and thermally stable diamond bonded compacts formed therefrom will be apparent to those skilled in the art. It is, therefore, to be understood that within the scope of the appended claims, that such materials, compacts and constructions as disclosed herein may be practiced otherwise than as specifically described.

What is claimed is:

1. A thermally stable diamond bonded construction comprising:
   a diamond bonded body comprising:
   a thermally stable region comprising a plurality of diamond grains that are bonded together by a reaction product of the diamond grains with silicon;
   a polycrystalline diamond region positioned adjacent the thermally stable region and that includes intercrystalline bonded together diamond grains and a metal solvent catalyst disposed within interstitial regions;
   wherein the diamond bonded body further comprises a ceramic compound dispersed therein formed by reaction of a getter material selected from the group consisting of Nb, Zr, Ti, Mo and mixtures thereof with a gaseous element generated during formation of the diamond bonded body at high pressure-high temperature conditions; and
   a metallic substrate attached to the polycrystalline diamond region.

2. The thermally stable diamond bonded construction as recited in claim 1 wherein the ceramic compound is selected from the group consisting of oxides, nitrides, and hydrides of the getter material.

3. The thermally stable diamond bonded construction as recited in claim 1 wherein the polycrystalline diamond region comprises the reaction product.

4. The thermally stable diamond bonded construction as recited in claim 1 wherein the thermally stable diamond region is substantially free of the metal catalyst material used to form the diamond bonded body at the high pressure-high temperature conditions.

5. The thermally stable diamond bonded construction as recited in claim 1 wherein the diamond bonded body has a diamond volume content of greater than about 90 percent.

6. The thermally stable diamond bonded construction as recited in claim 5 wherein the diamond bonded body comprises from about 0.1 to 15 percent by weight of the ceramic compound.

7. A bit for drilling subterranean formations comprising a body and a number of cutting elements attached thereto, wherein one or more of the cutting elements comprises the thermally stable diamond bonded construction as recited in claim 1.

8. A thermally stable diamond bonded construction comprising:
   a diamond bonded body comprising;
   a thermally stable region extending a distance below a diamond bonded body surface, the thermally stable region having a material microstructure comprising a plurality of diamond grains bonded together by a reaction product of the diamond grains and a reactant;
   a polycrystalline diamond region extending a depth from the thermally stable region and having a material microstructure comprising intercrystalline bonded together diamond grains and a metal solvent catalyst disposed within interstitial regions between the intercrystalline bonded together diamond grains; and a metallic substrate attached to the polycrystalline diamond region;

wherein the reactant is selected from the group of materials capable of reacting with the diamond at a temperature below the melting temperature of the metal solvent catalyst, and wherein the diamond body has a diamond volume content of greater than about 90 percent; and wherein the diamond body includes a ceramic compound formed by reaction of a gaseous species with a getter material during high pressure-high temperature processing.

9. The construction as recited in claim 8 wherein the getter material is selected from the group consisting of Nb, Zr, Ti, Mo and combinations thereof.

10. The construction as recited in claim 8 wherein the ceramic compound is selected from the group consisting of oxides, nitrides, and hydrides of the getter material.

11. The construction as recited in claim 10 wherein the diamond body comprises in the range of from about 0.1 to 15 percent by weight of the ceramic compound.

12. The construction as recited in claim 8 comprising a nonplanar interface between the thermally stable region and the polycrystalline diamond region.

13. The construction as recited in claim 8 wherein the diamond body includes a top surface, and wherein both the thermally stable region and the polycrystalline region extend therealong.

14. The construction as recited in claim 8 wherein the reaction product comprises SiC.

15. The construction as recited in claim 14 wherein the SiC volume content in the thermally stable region is less than about 20 percent.

16. The construction as recited in claim 8 wherein the thermally stable region is substantially free of the metal solvent catalyst.

17. The construction as recited in claim 8 wherein the reactant has a melting temperature that is below the melting temperature of the metal solvent catalyst.

18. The construction as recited in claim 8 wherein a majority of the diamonds bonded grains in the thermally stable region are bonded together by the reaction product of the diamond grains and the reactant.

19. The construction as recited in claim 18 wherein greater than about 75 percent of the diamonds bonded in the thermally stable region are bonded together by the reaction product of the diamond grains and the reactant.

20. A bit for drilling subterranean formations comprising a body and a plurality of cutting element operatively attached to the body, wherein at least one cutting element comprises the construction as recited in claim 8.

21. A bit for drilling subterranean formations comprising a body and a plurality of cutting elements attached to the body, the cutting elements comprising:

a diamond body comprising:

a thermally stable region having a material microstructure comprising a plurality of diamond grains bonded together by a reaction product of the diamond grains and a reactant; and a polycrystalline diamond region extending from the thermally stable region and having a material microstructure comprising a matrix phase of intercrystalline bonded together diamond grains, and plurality of interstitial regions disposed between the intercrystalline bonded together diamond grains and comprising a metal solvent catalyst disposed therein, wherein the diamond body further comprises a ceramic compound comprising an element selected from the group consisting of Nb, Zr, Ti, Mo and combinations thereof formed in situ during a high pressure/high temperature process of forming the diamond body; and a metallic substrate attached to the diamond body.

22. The drill bit as recited in claim 21 wherein the reactant is selected from the group of materials capable of reacting with the diamond at a temperature below the melting temperature of the metal solvent catalyst.

23. The drill bit as recited in claim 21 wherein the diamond body has a diamond volume content of greater than about 90 percent.

24. The drill bit as recited in claim 21 wherein the ceramic compound is selected from the group consisting of oxides, nitrides, and hydrides.

25. The drill bit as recited in claim 21 wherein the diamond body comprises in the range of from about 0.1 to 15 percent by weight of the ceramic compound.

26. The drill bit as recited in claim 21 wherein the diamond body includes a top surface, and wherein both the thermally stable region and the polycrystalline region extend thereal ong.

27. The drill bit as recited in claim 21 wherein the reaction product comprises SiC.

28. The drill bit as recited in claim 27 wherein the SiC volume content in the thermally stable region is less than about 20 percent.

29. The drill bit as recited in claim 21 wherein the thermally stable region is substantially free of the metal solvent catalyst.

30. The drill bit as recited in claim 21 wherein the reactant has a melting temperature that is below the melting temperature of the metal solvent catalyst.

31. The drill bit as recited in claim 21 wherein a majority of the diamonds bonded grains in the thermally stable region are bonded together by the reaction product of the diamond grains and the reactant.

32. The drill bit as recited in claim 31 wherein greater than about 75 percent of the diamonds bonded in the thermally stable region are bonded together by the reaction product of the diamond grains and the reactant.

* * * * *